United States Patent [19]
Shakespear

[11] 3,819,197
[45] June 25, 1974

[54] SEMIRIGID SHOULDER BELTS

[75] Inventor: Horacio Shakespear, West Bloomfield, Mich.

[73] Assignee: General Motors Corporation, Detroit, Mich.

[22] Filed: Dec. 5, 1972

[21] Appl. No.: 312,334

[52] U.S. Cl............ 280/150 SB, 297/388, 297/389
[51] Int. Cl............................................ B60r 21/10
[58] Field of Search........ 280/150 SB; 297/388, 389

[56] References Cited
UNITED STATES PATENTS

| | | | |
|---|---|---|---|
| 2,705,586 | 4/1955 | Young | 280/150 SB X |
| 2,898,976 | 8/1959 | Barecki | 280/150 SB X |
| 3,304,119 | 2/1967 | Boedigheimer | 297/388 |
| 3,534,979 | 10/1970 | Barecki | 280/150 SB |

OTHER PUBLICATIONS

American Seating, copyright 1957, American Seating Co., "Autocrash Safety Research, Etc.", by Barecki.

*Primary Examiner*—David Schonberg
*Assistant Examiner*—Michael J. Forman
*Attorney, Agent, or Firm*—Herbert Furman

[57] ABSTRACT

A vehicle occupant restraint belt arrangement includes a movable lap belt retractor housing with a pair of flexible end portions through which belt ends of a lap belt are extendable for movement from a stored position to a restraining position extending across an occupant's lap so as to restrain the lower torso portion. A pair of semirigid shoulder belts have lower ends respectively looped over the flexible end portions of the movable retractor housing. An inertia retractor mounted on the associated vehicle roof receives a control belt whose free end is attached to the upper ends of the shoulder belts such that they are adaptable to extend downwardly from the roof on each side of the occupant's head so as to restrain the upper torso by engagement with the occupant's shoulders. The end portions of the movable retractor housing are flexed to move the shoulder belts away from each other to outwardly bowed positions where they are clear of the occupant's head during movement to and from the restraining position. A resilient member mounted on a forward portion of the roof selectively attaches the movable lap belt retractor housing by a snap action so that the shoulder belts extend along the roof in a manner defining a storage position of the belt arrangement.

3 Claims, 3 Drawing Figures

PATENTED JUN 25 1974 3,819,197

SEMIRIGID SHOULDER BELTS

BACKGROUND OF THE INVENTION

This invention relates generally to vehicle occupant restraint belt arrangements which include a lap belt and a pair of shoulder belts for restraining an occupant in seated position on a vehicle seat.

For many years it has been known to provide vehicle occupant restraint belt arrangements which include a lap belt and a pair of shoulder belts for restraining an occupant in seated position on a vehicle seat. Certain belt arrangements of this type have the upper ends of the shoulder belts secured to the vehicle roof and the lower ends of the shoulder belts permanently affixed to the lap belt such that use of the shoulder belts necessarily accompanies use of the lap belt. With this type of belt arrangement, the occupant's head must pass between the shoulder belts during movement of the belt arrangement to and from restraining position. The shoulder belts may interfere with the occupant's head as it passes between them if these belts are not spaced at a sufficient distance from each other. This is a particularly important consideration for female occupants whose hairstyles significantly enlarge the size of their heads.

SUMMARY OF THE INVENTION

One feature of this invention is that it provides a vehicle occupant restraint belt arrangement in which a lap belt is adaptable to extend across an occupant's lap to restrain the lower torso portion and the lower ends of first and second semirigid shoulder belts are secured relative to the lap belt with their upper ends secured to the vehicle roof so that the shoulder belts may be flexed away from each other to outwardly bowed positions clear of the occupant's head during movement to and from a restraining position where they restrain the upper torso portion by engagement with each shoulder. Another feature of the invention is that a movable lap belt retractor housing selectively stores the lap belt and has flexible end portions which attach the lower ends of the semirigid shoulder belts, and the housing and portions are flexed to move the shoulder belts away from each other to their outwardly bowed positions. Another feature of the invention is that the end portions of the lap belt retractor housing define apertures through which the opposite ends of the lap belt are extendable and the lower ends of the shoulder belts are respectively looped over these end portions so that they bow outwardly as the end portions are flexed. Another feature of the invention is that the upper ends of the shoulder belts are secured to a control belt received by a roof mounted inertia retractor that secures the upper end of the belt arrangement. Another feature of the invention is that a resilient storage member mounted on a forward portion of the roof detachably secures the movable lap belt retractor housing to the roof so that the shoulder belts extend along the roof and define a storage position of the belt arrangement. Another feature of the invention is that the storage member is composed of a resilient material so that the lap belt retractor housing is snapped into its storage position.

BRIEF DESCRIPTION OF THE DRAWINGS

The above specified features and other features of the present invention are readily apparent from the following detailed description of the preferred embodiment and the drawings in which.

DETAILED DESCRIPTION OF THE PREFERRED EMBODIMENT

Figure 1:
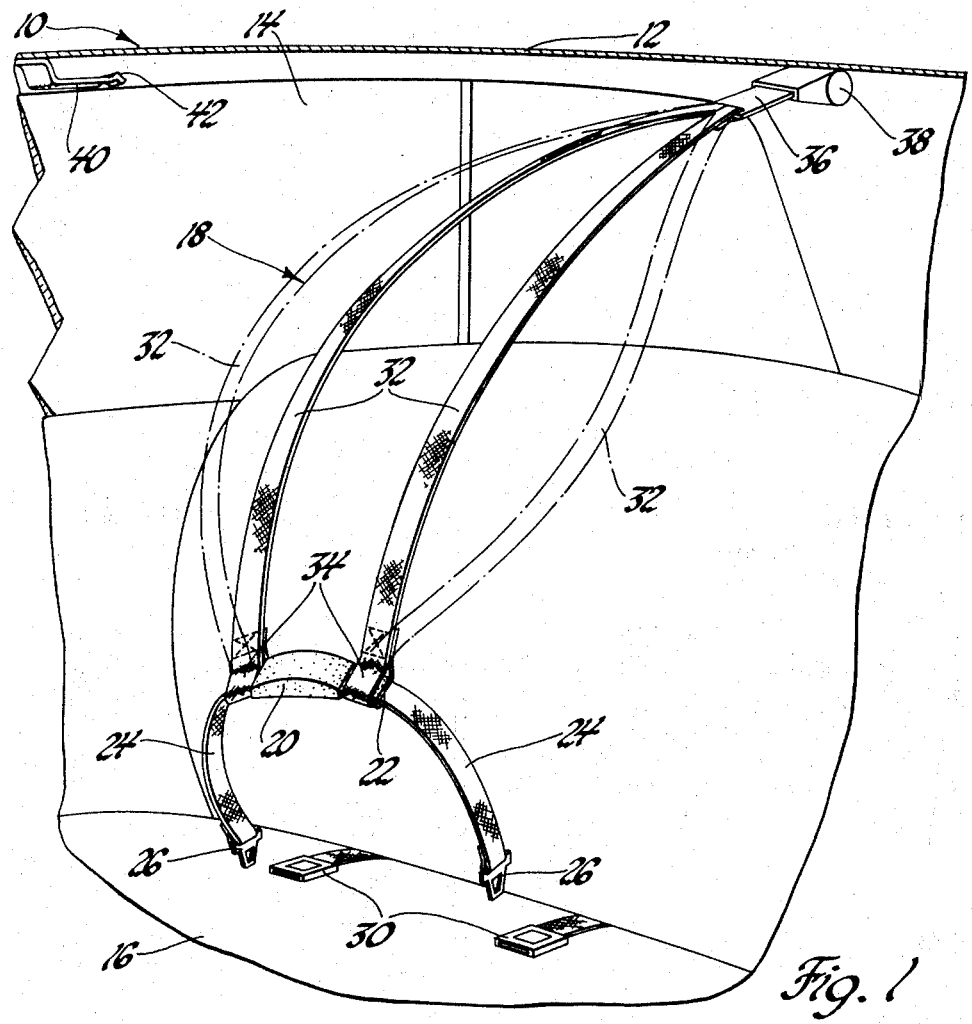
FIG. 1 is a perspective view of the interior portion of a vehicle body whose occupant compartment includes an occupant restraint belt arrangement, according to this invention, with the shoulder belts of the belt arrangement shown in a solid line indicated restraining position where they restrain an occupant, and also in a phantom line indicated outwardly bowed position where they pass freely over an occupant's head during vertical movement of the belt arrangement to and from the restraining position.

Referring to FIG. 1 of the drawings, a vehicle generally indicated by 10 includes a roof shown in simplified form by a roof panel 12. This roof panel cooperates with the vehicle floor and other body members to define an occupant compartment indicated by 14. Within this occupant compartment a vehicle seat 16 is mounted on the vehicle floor in a conventional manner such as by a seat adjuster mechanism. An occupant restraint belt arrangement according to this invention is indicated generally by 18 and is adaptable to restrain an occupant in seated position on seat 16.

Figure 3:
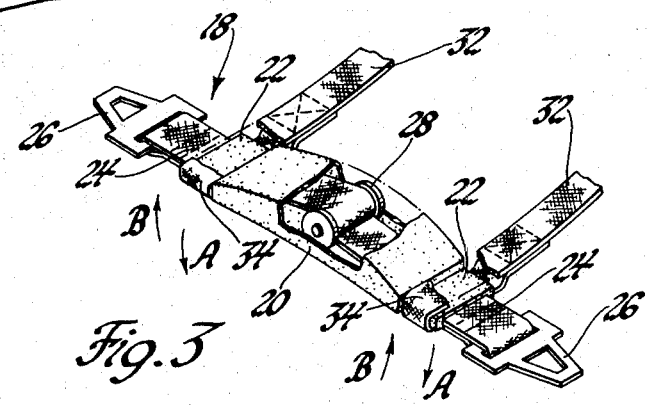
FIG. 3 is a partially broken away perspective view of the movable lap belt retractor housing shown in FIGS. 1 and 2.

Restraint belt arrangement 18 includes a movable lap belt retractor housing 20 which is composed of a somewhat flexible plastic material. Retractor housing 20 includes flexible end portions 22, see also FIG. 3, which define apertures slidably receiving the respective ends of a lap belt 24. Each end of this lap belt has a D-ring 26 secured to it, and a spring-biased belt reel 28 within housing 20 normally retracts the ends of the lap belt so that the D-rings 26 are positioned adjacent the respective end portions 22 of the retractor housing in a storage position. Outward extending movement of the lap belt ends allows it to be moved to a restraining position across an occupant's lap generally in the orientation shown by FIG. 1. The D-rings 26 are selectively attached to suitable vehicle body mounted buckles 30 adjacent the seat cushion of seat 16. While it is not shown by the drawings, it is also possible to provide an adjustment means at one or both ends of the lap belt to allow the lap belt to accomodate occupants of different sizes. This adjustment may also be provided by selectively controlling the location of the buckles 30 in a suitable manner.

The belt arrangement also includes a pair of shoulder belts 32 which are composed of conventional lengths of restraint belt stiffened by suitable flexible plastic stays that extend longitudinally along the lengths of the belts. These lengths of belt thus are semirigid so as to be capable of assuming both the solid and phantom line indicated positions shown in FIG. 1. The lower ends of the shoulder belts include loops 34 which encircle the end portions 22 of retractor housing 20 to thus secure the shoulder belts relative to this housing. It is also possible to use some type of adhesive or other suitable attachment for further securing these shoulder belts relative to this housing. The upper ends of shoulder belts 32 are secured at a common juncture to the free end of a control belt 36. This control belt is retracted and extended by an inertia retractor 38 fixedly mounted on the roof panel 12 just rearward of seat 16.

Figure 2:
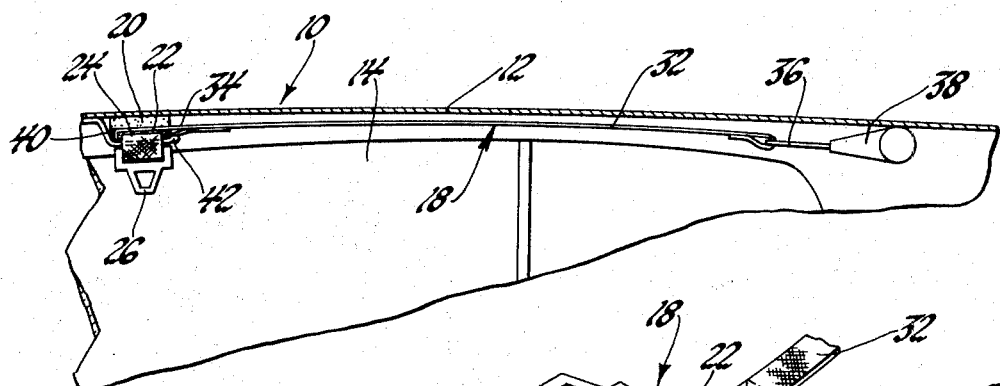
FIG. 2 is a view somewhat similar to FIG. 1 and shows the belt arrangement with its movable lap belt retractor housing snapped into a storage position by a roof mounted resilient storage member so as to define a storage position of belt arrangement.

A storage member 40 of a resilient material is mounted on a forward portion of the roof panel 12 and selectively receives the movable lap belt retractor housing 20 by a snap action so that a terminal flange 42 of the storage member maintains housing 20 in the FIG. 2 storage position where shoulder belts 32 extend along the roof panel 12 and define a storage position of the belt arrangement. The storage member 40 is deflected to move this retractor housing 20 from the storage position when an occupant enters the vehicle and desires to employ the belt arrangement. The occupant moves the retractor housing 20 downward from the storage position and, concomitantly, flexes the end portions 22 of the retractor housing in the direction of the arrows A shown in FIG. 3. This flexing movement causes the semirigid shoulder belts 32 to move away from each other and assume the outwardly bowed position shown by phantom lines in FIG. 1. The shoulder belts are thus free to move over an occupant's head without any interference in this outwardly bowed configuration. The shoulder belts, after passing over the occupant's head, are moved back to their solid line indicated restraining position of FIG. 1 by allowing the end portions 22 to flex back to their original positions by movement generally in the direction of the arrows B shown in FIG. 3.

A restrained occupant stores the belt arrangement by first detaching the D-rings 26 from their respective buckles 30 and by then flexing the shoulder belts 32 to their outwardly bowed configurations. Upward movement of the retractor housing 20 then allows the shoulder belts to pass over the occupant's head without any interference. The belt arrangement is then freely movable to storage position where retractor housing 20 is snapped into the FIG. 2 position between storage member 40 and roof panel 12.

It is thus apparent that this invention provides an improved occupant restraint belt arrangement.

What is claimed is:

1. In a vehicle body including a floor and a roof cooperably defining an occupant compartment in which an occupant seat is mounted on the floor, an occupant restraint belt arrangement comprising, lap belt means adaptable to extend across an occupant's lap to restrain the lower torso portion, first and second semirigid shoulder belts, first attachment means for securing upper ends of the shoulder belts to the roof, and second attachment means for securing lower ends of the shoulder belts to the lap belt means so that the shoulder belts are adaptable to extend downwardly from the roof on each side of the occupant's head over each shoulder to restrain the upper torso portion, the second attachment means being manually flexed to move the shoulder belts away from each other to outwardly bowed positions where they are clear of the occupant's head during movement to and from the restraining position and capable of assuming these outwardly bowed positions due to their semirigid nature.

2. In a vehicle body including a floor and a roof cooperably defining an occupant compartment in which an occupant seat is mounted on the floor, an occupant restraint belt arrangement comprising, a movable lap belt retractor housing with a lap belt having a pair of belt ends extendable from opposite ends of the housing for movement from a stored position to a position extending across an occupant's lap so as to restrain the lower torso portion, the retractor housing including a pair of flexible attachment portions adjacent the ends of the housing from which the lap belt extends, first and second semirigid shoulder belts with lower ends respectively secured to the flexible attachment portions of retractor housing, and attachment means for securing upper ends of the shoulder belts to the vehicle roof such that the shoulder belts are adaptable to extend downwardly from the roof on each side of the occupant's head over each shoulder to restrain the upper torso portion, the attachment portions of the retractor housing being manually flexed to move the shoulder belts away from each other to outwardly bowed positions where they are clear of the occupant's head during movement to and from restraining position.

3. In a vehicle body including a floor and a roof cooperably defining an occupant compartment in which an occupant seat is mounted on the floor, an occupant restraint belt arrangement comprising, a movable lap belt retractor housing with a lap belt having a pair of belt ends extendable from opposite ends of the housing for movement from a stored position to a position extending across an occupant's lap so as to restrain the lower torso portion, the retractor housing including a pair of flexible attachment portions adjacent the retractor ends from which the lap belt extends, first and second semirigid shoulder belts with lower ends respectively secured to the flexible attachment portions of the retractor housing, an inertia retractor mounted on the roof and receiving a control belt attached to upper ends of the shoulder belts such that the shoulder belts are adaptable to extend downwardly from the roof on each side of the occupant's head over each shoulder to restrain the upper torso portion, the attachment portions of the movable lap belt retractor housing being flexed to move the shoulder belts away from each other to outwardly bowed positions where they are clear of the occupant's head during movement to and from the restraining position, and storage means mounted on a forward portion of the roof and adaptable to detachably secure the movable lap belt retractor housing with the shoulder belts extending along the roof so as to define a storage position of the belt arrangement.

* * * * *